US006801978B2

(12) United States Patent
Sota

(10) Patent No.: US 6,801,978 B2
(45) Date of Patent: Oct. 5, 2004

(54) CROSSBAR SYSTEM WITH INCREASED THROUGHPUT

(75) Inventor: Yasuhiro Sota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/442,046

(22) Filed: May 21, 2003

(65) Prior Publication Data

US 2003/0221043 A1 Nov. 27, 2003

(30) Foreign Application Priority Data

May 21, 2002 (JP) ........................................ 2002-146712

(51) Int. Cl.[7] .............................................. G06F 13/00
(52) U.S. Cl. ........................ 710/317; 710/113; 370/351
(58) Field of Search ................................. 710/317, 316, 710/112–114; 370/362, 364, 389, 392, 395.41, 395.42, 351

(56) References Cited

U.S. PATENT DOCUMENTS

| 6,314,487 | B1 | * | 11/2001 | Hahn et al. .................. | 710/317 |
| 6,636,933 | B1 | * | 10/2003 | MacLellan et al. .......... | 710/317 |
| 2003/0191879 | A1 | * | 10/2003 | Marmash .................... | 710/113 |

FOREIGN PATENT DOCUMENTS

| EP | 1111858 A2 | * | 6/2001 | .......... H04L/12/56 |
| JP | A 11-212927 | | 8/1999 | |

OTHER PUBLICATIONS

S. Q. Zheng, Mei Yang, J. Blanton, P. Golla, and D. Verchere, "A simple and fast parallel round–robin arbiter for high–speed switch control and scheduling", in Proc. The 45th IEEE International Midwest Symposium on Circuits and Systems, Aug. 2002.*

* cited by examiner

Primary Examiner—Mark H. Rinehart
Assistant Examiner—Clifford Knoll
(74) Attorney, Agent, or Firm—Young & Thompson

(57) ABSTRACT

A requester includes an output data register which retains a data piece to be output to a relay register of a crossbar, and two request registers which output a request corresponding to the data piece. The requester sets a next data piece in the output data register, and sets a corresponding request in the request register in response to a selection signal from the crossbar. The crossbar outputs a grant signal representing that output of a data piece output from the requester to an output port is permitted to the requester, and at the same time, switches selection between requests from the two request registers in accordance with a request selection register prepared in advance, and inputs the selected request to an arbiter.

22 Claims, 10 Drawing Sheets

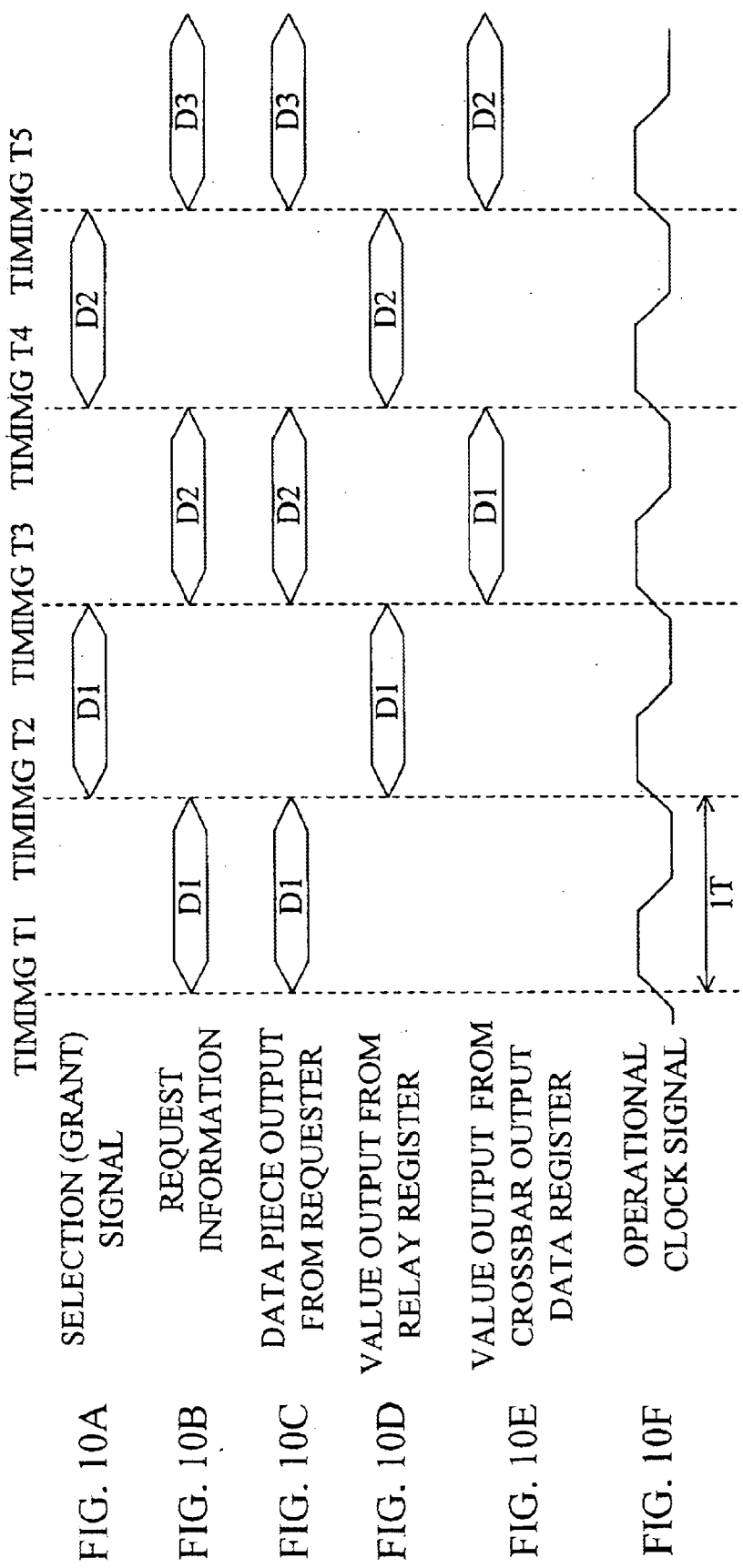

CROSSBAR SYSTEM WITH INCREASED THROUGHPUT

BACKGROUND OF THE INVENTION

1. Field of the Invention

The present invention relates to a crossbar circuit.

2. Description of the Related Art

One example of a conventional crossbar is disclosed in FIG. 1 of Unexamined Japanese Patent Application KOKAI Publication No. H11-212927. According to the crossbar disclosed in this publication, if the number of inputs increases, the structure of the crossbar become complicated and wiring delay and logical delay become larger, resulting in that the time required for processing is increased.

To solve this problem, the inventor of the present invention has got an idea that registers for retaining a data piece and an arbitration result generated by an arbiter should be provided on a data path and a path through which the arbitration result flows. A block diagram representing a data exchange system employing a crossbar 440 having this structure is shown in FIG. 9.

As shown in FIG. 9, this data exchange system comprises requesters 400 and 410, and the crossbar 440.

The requester 400 includes an output data register 401, an output control circuit 402, and a request register 403, and outputs a data piece and a request to the crossbar 440. The output control circuit 402 receives selection signals from selection registers 423 and 433 of the crossbar 440. In a case where the received selection signal represents that "a preceding data piece has been allowed to be output to a crossbar output port OP0 or OP1", the output control circuit 402 sets a following data piece in the output data output control circuit 402 sets a following data piece in the output data register 401, and sets a request corresponding to the following data in the request register 403. The output data register 401 outputs the data piece set therein to a relay register 425, and the request register 403 outputs the request set therein to a request decoder 421.

The requester 410 has the same structure and functions as those of the requester 400, and is connected to another input port of the crossbar 440.

The crossbar 440 comprises crossbar output data registers 450 and 451, selectors 424 and 434, arbiters 422 and 432, selection registers 423 and 433 for retaining arbitration results of the arbiters 422 and 432 respectively, and relay registers 425 and 435 for retaining data pieces.

The request decoders 421 and 431 converts requests (information (request information) for specifying the requester, output destination, priority, etc.) input from the requester 400 and the requester 410 respectively, into request signals, and outputs the request signals to either of the arbiter 422 and the arbiter 423 that corresponds to the crossbar output port designated in the requests. The arbiters 422 and 432 arbitrate the requests input from the requesters 400 and 410 in accordance with the supplied request signals, and output a selection signal representing an arbitration result to the selection register 423 or the selection register 433. The selection registers 423 and 433 supply the selection signal to the selectors 424 and 434 respectively, and to the requesters 400 and 410 respectively. The relay registers 425 and 435 retain data pieces input by the requesters 400 and 410 to the crossbar 440. Each of the relay registers 425 and 435 outputs the retained data piece to the selectors 424 and 434. The selectors 424 and 434 select one of the two data pieces supplied thereto in accordance with the selection signal output from the selection register 423 or 433, and set the selected data piece in the crossbar output data registers 450 and 451 respectively. The crossbar output data registers 450 and 451 output the set data to the crossbar output ports OP0 and OP1.

An operation clock is supplied to each component described above, so that the components can operate synchronously. For example, the output data registers 401 and 411, the request registers 403 and 413, the relay registers 425 and 435, the selection registers 423 and 433, and the crossbar output data registers 450 and 451 retain an input data piece in response to a rise of a clock signal, and outputs a retained data piece in response to a fall of a clock signal.

Next, an operation of this system will be explained with reference to timing charts shown in FIG. 10A to FIG. 10F, by employing a case where the requester 400 outputs data pieces D1, D2, D3, . . . successively to the crossbar output port OP0, as an example. Note that it is assumed as a premise that an operation clock shown in FIG. 10F is supplied to each component.

First, the output data register 401 of the requester 400 outputs a data piece D1 to the relay register 425 at the timing T1 in accordance with the operation clock, as shown in FIG. 10B. The relay register 425 outputs the data piece D1 at the timing T2 in accordance with the next operation clock, as shown in FIG. 10D.

In the meantime, the request register 403 outputs request information corresponding to the data piece D1 at the timing T1. The arbiter 422 arbitrates the output request, and sends a selection signal representing an arbitration result to the selection register 423.

The selection register 423 outputs the selection signal for causing the data piece D1 to be output, at the timing T2 in response to the next operation clock, as shown in FIG. 10D. The selector 424 selects and outputs a data piece supplied from either one of the relay registers 425 and 435 in accordance with the selection signal (in this example, the selector 424 selects the data piece D1 from the relay register 425).

The relay register 425 outputs the data piece D1 at the timing T2 in accordance with the next operation clock, as shown in FIG. 10D. At the same timing, the selection register 423 outputs the selection signal (grant signal) to the selector 424 and to the output control circuit 402, as shown in FIG. 10A. The selector 424 transfers the data piece output from the relay register 425 to the crossbar output data register 450.

The selection signal is also supplied to the output control circuit 402. Thereby, the output control circuit 402 sets a data piece D2 in the output data register 401 and sets request information corresponding to the data piece D2 in the request register 403 at the timing T2. The data piece D2 and the corresponding request information will be output at the timing T3.

The same operation will be repeated for the following data pieces. As described, according to this system, even though the data pieces can be successively output from the crossbar 440 without being stopped at the requester 400 due to an arbitration result, a dead cycle amounting to 1T (=1 clock cycle) is produced between the timing at which the requester 400 or 410 outputs a preceding data piece and the timing at which the requester 400 or 410 outputs the next data piece.

Suppose that a following data piece is to be set in the output data register 401 at the same timing at which a preceding data piece is output to the relay register 425, in order to prevent the dead cycle from being produced. In this case, if the data pieces should be output successively and if the preceding data piece is stopped for a while from being output due to an arbitration result, the request information corresponding to the preceding data piece can not be saved from disappearing since the request information corresponding to the following data piece will be written upon the request information corresponding to the preceding data piece.

The crossbar having the structure described so far, needs to receive input of a next data piece and a request corresponding to the next data piece at a timing at which a preceding data piece is output therefrom or at a timing thereafter, in order to prevent disappearance of the request information of the data piece. As a result, the latency is long and the throughput is low.

SUMMARY OF THE INVENTION

The present invention was made in view of the above described problem, and an object of the present invention is therefore to provide a crossbar having registers provided on a data path through which a data piece flows and on an arbitration path through which an arbitration result flows, and thus achieving a shorter latency.

Another object of the present invention is to provide a crossbar having a high throughput.

To achieve the above objects, a crossbar circuit according to a first aspect of the present invention is a crossbar circuit comprising: i (i being a natural number equal to or greater than 2) number of requesters; and a crossbar which receives from the i number of requesters, an output data piece and request information including information representing that the output data piece is requested to be output from a desired output port among k (k being a natural number) number of output ports included in the crossbar, and which outputs the received output data piece to the desired output port, wherein:

each of the requesters includes an output data register from which the output data piece is output, j (j being a natural number equal to or greater than 2) number of request information registers from which the request information is output, and an output control circuit;

the crossbar includes i number of data input ports which are arranged in one to one correspondence to the i number of requesters, i number of request information input circuits which are arranged in one to one correspondence to the i number of requesters, and which each have j number of request information input ports for receiving the request information from the requesters, i number of relay circuits which are connected to the i number of data input ports respectively, and which retain a data piece input thereto, i number of first selection circuits which are arranged in one to one correspondence to the i number of request information input circuits, and which select any of j number of request information supplied from a corresponding one of the request information input circuits in accordance with a selection control signal retained by themselves, k number of arbiters which are arranged in one to one correspondence to the k number of output ports, and which each arbitrate requests represented by the j number of request information output from the i number of first selection circuits, and output an arbitration result signal, k number of selection registers which are arranged in one to one correspondence to the k number of arbiters, and which retain the arbitration result signal output from a corresponding one of the arbiters, k number of second selection circuits which are arranged in one to one correspondence to the k number of selection registers, and which receive the arbitration result signal from a corresponding one of the selection registers, receive output data pieces from the i number of relay circuits, select any one of the received output data pieces in accordance with the received arbitration result signal, and output the selected output data piece to the output port associated with themselves in one to one correspondence, and i number of request selection control circuits which are arranged in one to one correspondence to the i number of relay circuits, and which receive the arbitration result signals output from the k number of arbiters, updates the selection control signal based on the arbitration result signals, and supplies the selection control signal to the first selection circuits; and the output control circuit is a circuit which receives the arbitration result signal from the crossbar, controls the output data register to output an output data piece retained therein to the crossbar in a case where the received arbitration result signal represents that the output data piece which had been output from the requester in which the output control circuit itself is included is selected to be output from the crossbar, sets an output data piece to be output next in the output data register, and sets request information corresponding to the output data piece to be output next in another request information register without changing the content of the request information register in which the request information corresponding to the output data piece which has just been output is stored.

The crossbar may further include i number of decoding circuits which are arranged in one to one correspondence to the i number of first selection circuits, and which convert the request information to the request and send the request to the desired output port which is designated by the request information.

Each of the arbiters may arbitrate requests output from the i number of decoding circuits, and output the arbitration result signal.

The first selection circuits may select the request information input ports cyclically in accordance with the selection control signal retained by themselves to select the j number of request information.

The output control circuit may cyclically select the request information registers in which request information corresponding to an output data piece to be output next is set.

The crossbar may further include:

k number of request output ports; and k number of third selection circuits which are arranged in one to one correspondence to the k number of selection registers, and which each receive the arbitration result signal from a corresponding one of the selection registers, select any of request information selected by the i number of first selection circuits, and output the selected request information to the request output ports associated with themselves in one to one correspondence.

In the crossbar, each of the i number of relay circuits may be a circuit which is constituted by m (m being a natural number) number of registers.

The crossbar circuit may operate synchronously with a clock signal, which is generated periodically.

To achieve the above objects, a crossbar circuit according to a second aspect of the present invention is a crossbar circuit comprising: i (i being a natural number equal to or greater than 2) number of requesters; and a crossbar which receives from the i number of requesters, an output data piece and request information including information representing that the output data piece is requested to be output from a desired output port among k (k being a natural number) number of output ports included in the crossbar, and which outputs the received output data piece to the desired output port, wherein:

each of the requesters includes an output data register from which the output data piece is output, j (j being a natural number equal to or greater than 2) number of request information registers from which the request information is output, and an output control circuit; and the crossbar includes i number of data input ports which are arranged in one to one correspondence to the i number of requesters, i number of request information input circuits which are arranged in one to one correspondence to the i number of requesters, and which each have j number of request information input ports for receiving the request information from the requesters, i number of relay circuits which are connected to the i number of data input ports respectively, and which retain a data piece input thereto, i number of first selection circuits which are arranged in one to one correspondence to the i number of request information input circuits, and which select any of j number of request information supplied from a corresponding one of the request information input circuits in accordance with a selection control signal retained by themselves, k number of arbiters which are arranged in one to one correspondence to the k number of output ports, and which each arbitrate requests represented by the j number of request information output from the i number of first selection circuits, and output an arbitration result signal, k number of selection registers which are arranged in one to one correspondence to the k number of arbiters, and which retain the arbitration result signal output from a corresponding one of the arbiters, k number of second selection circuits which are arranged in one to one correspondence to the k number of selection registers, and which receive the arbitration result signal from a corresponding one of the selection registers, receive output data pieces from the i number of relay circuits, select any one of the received output data pieces in accordance with the received arbitration result signal, and output the selected output data piece to the output port associated with themselves in one to one correspondence, i number of request selection control circuits which are arranged in one to one correspondence to the i number of relay circuits, and which receive the arbitration result signals output from the k number of arbiters, updates the selection control signal based on the arbitration result signals, and supplies the selection control signal to the first selection circuits, and i number of circuits which are arranged in one to one correspondence to the i number of requesters, and which supply the arbitration result signal to the requesters in order to cause the requesters to control outputting of the output data piece and outputting of the request information.

The crossbar may further include i number of decoding circuits which are arranged in one to one correspondence to the i number of first selection circuits, and which convert the request information to the request and send the request to the desired output port which is designated by the request information.

Each of the arbiters may arbitrate requests output from the i number of decoding circuits, and output the arbitration result signal.

The crossbar may farther include k number of output data registers, which are arranged in one to one correspondence to the k number of second selection circuits, and which retain an output data piece output from a corresponding one of the second selection circuit, and output the retained output data piece to the output port associated with themselves in one to one correspondence.

The k number of second selection circuits may be circuits which are arranged in one to one correspondence to the k number of selection registers, and which receive the arbitration result signal from a corresponding one of the selection registers, receive output data pieces from the i number of relay circuits, select any one of the received output data pieces in accordance with the received arbitration result signal, and output the selected output data piece to the output data registers.

The first selection circuits may select the request information input ports cyclically in accordance with the selection control signal retained by themselves to select the j number of request information.

The output control circuit may cyclically select the request information registers in which request information corresponding to an output data piece to be output next is set.

The crossbar may further include:

k number of request output ports; and k number of third selection circuits which are arranged in one to one correspondence to the k number of selection registers, and which each receive the arbitration result signal from a corresponding one of the selection registers, select any of request information selected by the i number of first selection circuits, and output the selected request information to the request output ports associated with themselves in one to one correspondence.

The crossbar may further include request relay registers which are arranged between the first selection circuits and the third selection circuits, and which retain and output request information selected by the first selection circuits.

The crossbar may further include k number of request output registers which are arranged in one to one correspondence to the k number of third selection circuits, and which retain request information output from a corresponding one of the third selection circuits and output the request information to the request output ports associated with themselves in one to one correspondence.

The k number of third selection circuits may be circuits which are arranged in one to one correspondence to the k number of selection registers, and which receive the arbitration result signal from a corresponding one of the selection registers, receive output data pieces from the i number of relay registers, select any of the received output data pieces in accordance with the received arbitration result signal, and output the selected output data piece to the request output registers.

In the crossbar, each of the i number of relay circuits may be a circuit which is constituted by m (m being a natural number) number of registers.

In the crossbar, there may be a relationship m<k, between the value m and the value k.

The crossbar circuit may operate synchronously with a clock signal, which is generated periodically.

In the crossbar circuit, there may be a relationship k>n, between the value k and a value n which represents a number of clock cycles needed from a timing at which request information is selected by the i number of first selection circuits to a timing at which the arbitration result signal is set in the k number of selection registers.

BRIEF DESCRIPTION OF THE DRAWINGS

These objects and other objects and advantages of the present invention will become more apparent upon reading of the following detailed description and the accompanying drawings in which:

FIG. 4A to FIG. 4H are diagrams showing timing charts of various components of the crossbar of FIG. 2 and requester of FIG. 3, wherein FIG. 4A represents which selection signal is directed to which data piece, FIG. 4B represents an output from which request register a request selection register selects, FIGS. 4C and 4D represent request information output from a request register EVEN and request information output from a request register ODD respectively, FIG. 4E represents a data piece output from the requester, FIG. 4F represents a data piece output from a relay register, FIG. 4G represents a data piece output from a crossbar output data register, and FIG. 4H represents a schematic waveform of a clock signal;

FIG. 10A to FIG. 10F are diagrams showing timing charts of various components of a crossbar and requester shown in FIG. 9, wherein FIG. 10A represents which selection signal is directed to which data piece, FIG. 10B represents request information output from the requester, FIG. 10C represents a data piece output from the requester, FIG. 10D represents a data piece output from a relay register, FIG. 10E represents a data piece output from a crossbar output data register, and FIG. 10F represents a schematic waveform of a clock signal.

DETAILED DESCRIPTION OF THE PREFERRED EMBODIMENTS

Next, one embodiment of the present invention will be explained in detail with reference to the drawings.

Figure 1:
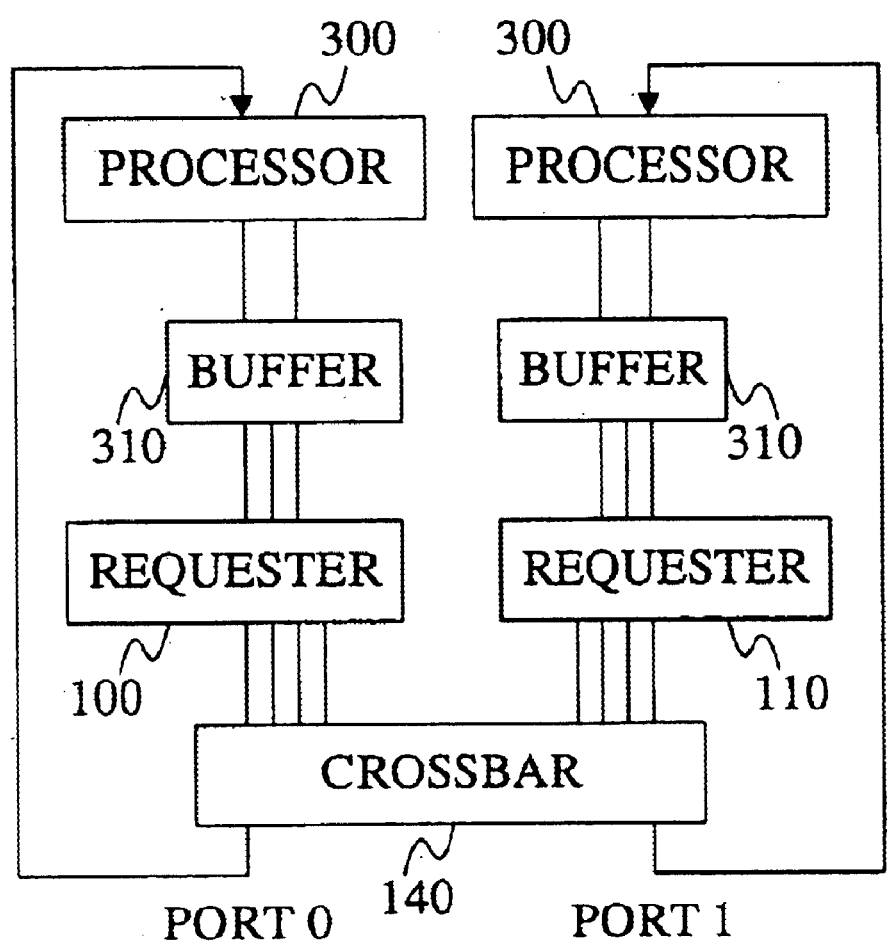
FIG. 1 is a block diagram showing a structure of a data exchange system employing a crossbar according to a first embodiment of the present invention.

A crossbar according to one embodiment of the present invention serves as a structural element of a crossbar switch for connecting a plurality of processors, FIG. 1 shows a block diagram of this crossbar switch.

It is known from FIG. 1 that a requester 100 and a requester 110 each have a buffer 310 connected thereto. The buffer 310 is a FIFO buffer. The buffer 310 is connected to a processor 300 and receives a message from the processor 300.

A data piece output from the processor 300 is once stored in the buffer 310. The processor 300 codes crossbar output port designation information for designating the output port of the data piece and an output request, and outputs them as a request to the buffer 310. (Hereinafter, the coded data representing the crossbar output port designation information and the output request will be referred to as request information.)

Each of the requesters 100 and 110 receives a pair of a data piece and its corresponding request information. The requesters 100 and 110 output a data piece waiting to be output and its corresponding request information to a crossbar 140 in accordance with a selection signal from the crossbar 140, and then receive a next data piece to be output and its corresponding request information. The crossbar 140 arbitrates outputting of the data pieces in accordance with the request information in order to successively output the data pieces from their designated ports (output ports 0 and 1) to each processor 300.

Figure 2:
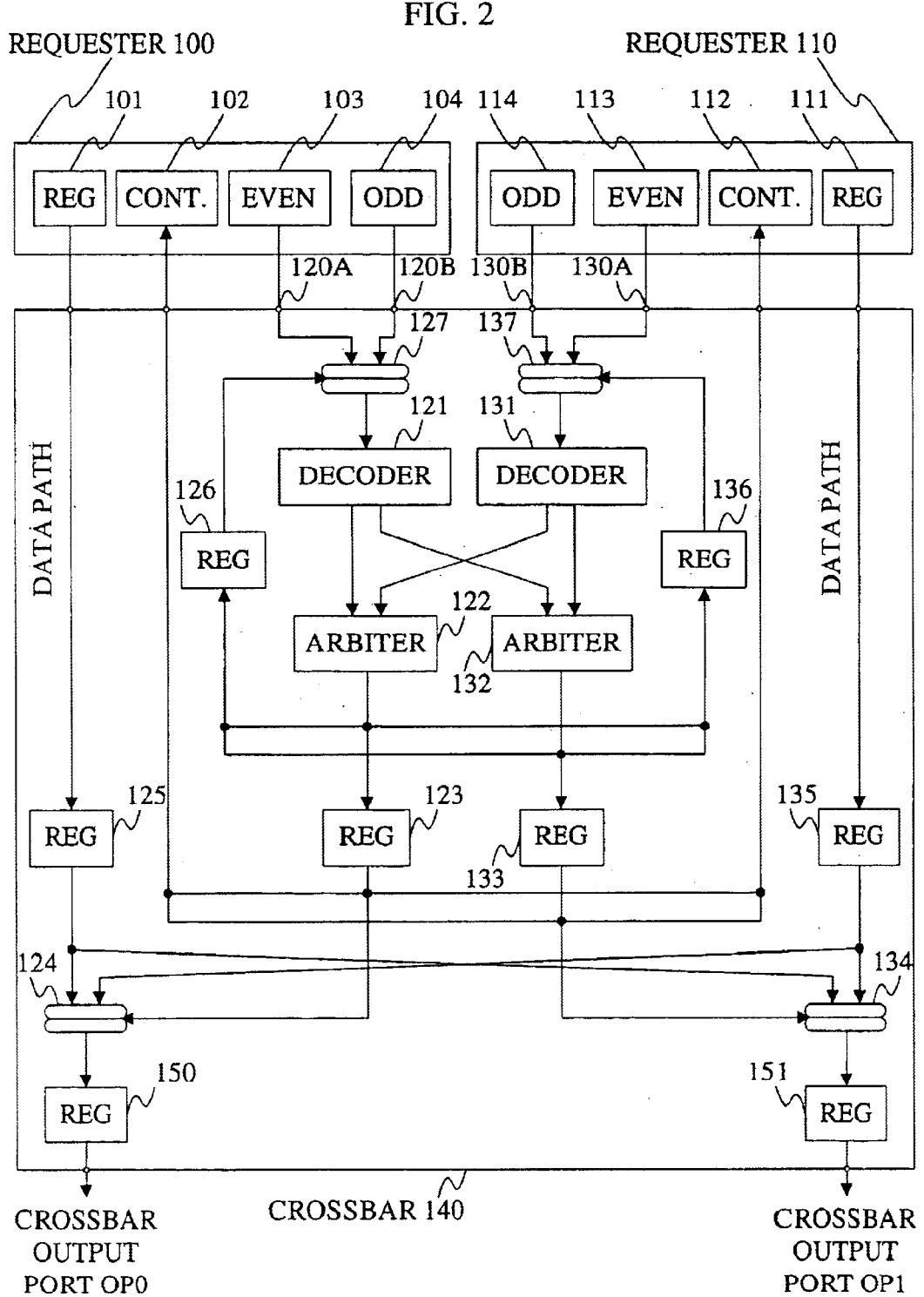
FIG. 2 is a block diagram showing a structure of the crossbar as the first embodiment of the present invention.

FIG. 2 shows a block diagram representing a control method of the crossbar as one embodiment of the present invention.

It is known from FIG. 2 that the crossbar 140 is connected to the requester 100 and the requester 110, so that a crossbar structure having two inputs and two outputs including the crossbar output port OP0 and the crossbar output port OP1 will be formed. The crossbar 140 has a function for outputting a data piece input by each requester synchronously with a clock signal to a crossbar output port designated by each requester.

The crossbar 140 comprises crossbar output data registers 150 and 151, selectors 124 and 134, arbiters 122 and 132, selection registers 123 and 133 for retaining an arbitration result by the arbiters, and request selection registers 126 and 136 for retaining a selection signal for selecting request input ports 120A and 120B or 130A and 130B based on the arbitration result by the arbiters. One of the two request input ports to which request information from each requester is input is selected by a selector 127 or 137 in accordance with a selection signal retained by the request selection register 126 or 136. The input request information is converted by a request decoder 121 or 131 into a request signal intended for a crossbar output port designated by the requester, and then output to the arbiter 122 or 132.

Data pieces input from the requesters to the crossbar 140 are once set in a relay register 125 or 135. The data piece in either one of the relay registers 125 and 136 is selected by the selectors 124 and 134 based on an arbitration result of the arbiters 122 and 132. The selected data piece is set in the crossbar output data register 150 or 151, and then output to the crossbar output port OP0 or OP1. The arbitration result is once retained in the selection registers 123 and 133, The arbitration result is also fed back to output control circuits 102 and 112.

Figure 3:
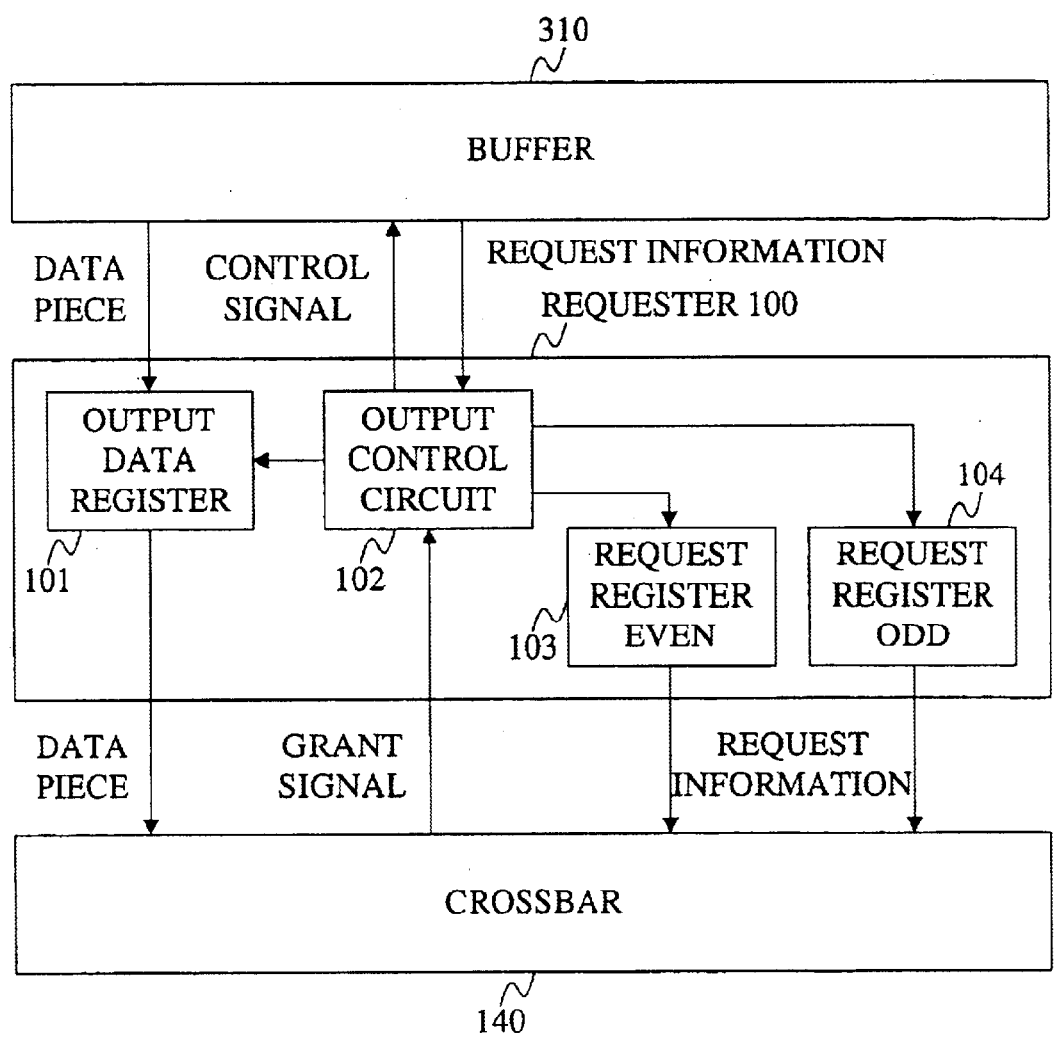
FIG. 3 is a block diagram showing a structure of a requester as the first embodiment of the present invention.
Figure 4:
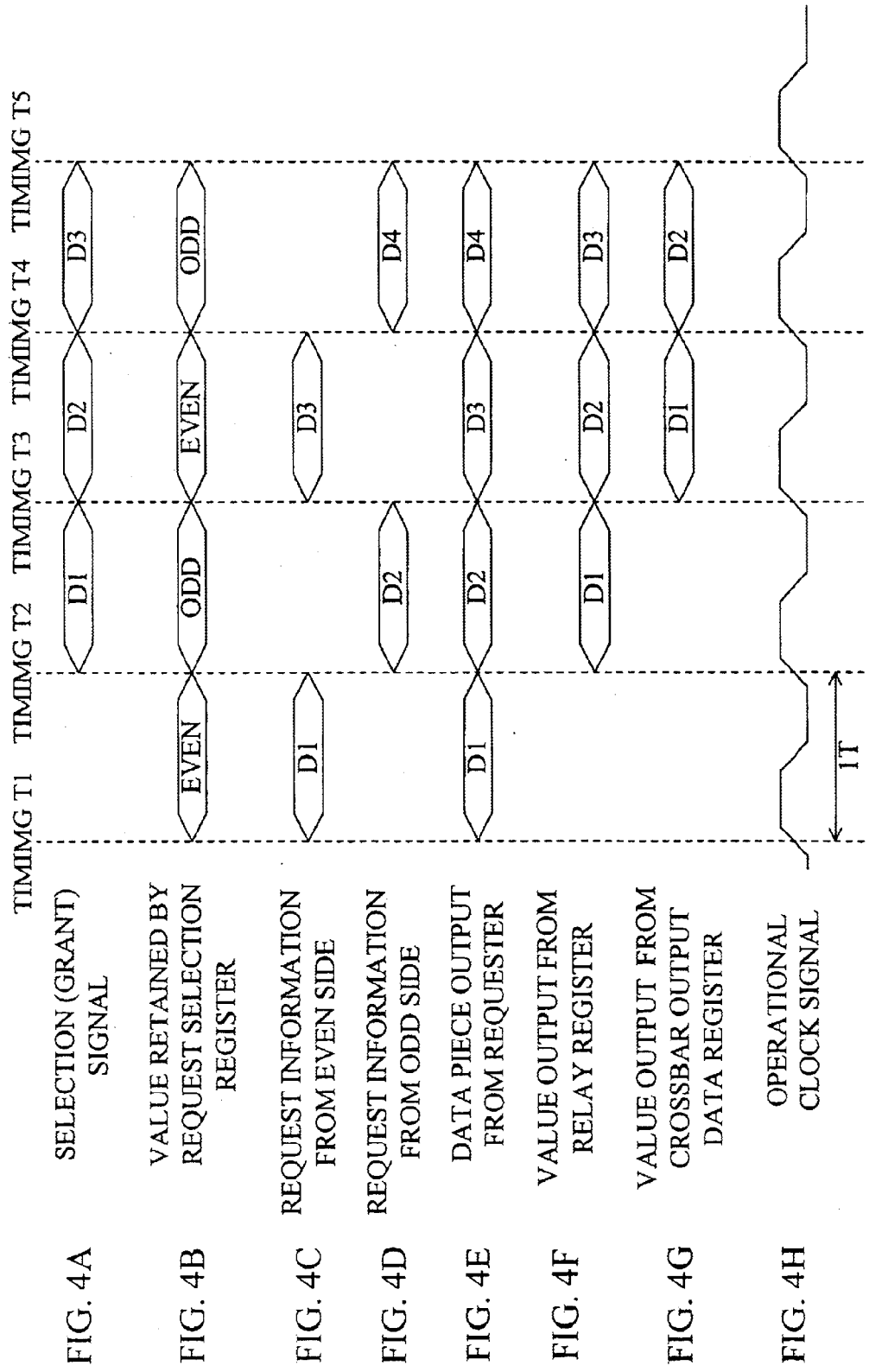

FIG. 3 shows a block diagram of the requester 100, which outputs a data piece to the crossbar 140.

It is known from FIG. 3 that the requester 100 comprises an output data register 101, an output control circuit 102, and two request registers for outputting request information to the crossbar 140 (a request register EVEN 103, and a request register ODD 104). The output control circuit 102 becomes able to set a data piece to be output next in the relay register 125 and to set the request information corresponding to this data piece in the request register 103 or the request register 104, due to a selection signal output from the crossbar 140. The request register 103 or the request register 104 is reset at a timing at which the selection signal is received. That is, the output control circuit 102 gets the request register 103 or 104 to represent no request information is retained therein. The output control circuit 102 sends to the buffer 310, a control signal for requesting the buffer 310 to supply a data piece and its corresponding request information. The output control circuit 102 sets the request information in the request register 103 or 104, at the same timing as setting the corresponding data piece in the output data register 101.

The requester 110 has the same function as that of the requester 100, and is connected to the crossbar 140 likewise the requester 100.

Next, an operation of one embodiment of the present invention will be explained with reference to the drawings.

As one embodiment, a case where a data piece is output from the requester 100 to the crossbar output port OP0 shown in FIG. 2 will be explained with reference to timing charts shown in FIG. 4A to FIG. 4H. In FIG. 4A to FIG. 4H, a case is assumed where a data piece from the requester 100 can be output from the crossbar output port OP0 in the shortest time period. That is, the timing charts shown in FIG. 4A to FIG. 4H are timing charts of a case where there is no other requester than the requester 100 that sends a request to the arbiter 122 (or a request from the requester 100 is always selected as a result of arbitration) and an arbitration result (a grant signal) can be output to the requester 100 (i.e., a data piece retained in the relay register 125 can be output to the output port OP0) 1T after the arbiter 122 receives a request from the requester 100. Note that it is assumed that request information corresponding to a preceding data piece is set in the request register EVEN 103.

1. Output of a Preceding Data Piece from the Requester

A preceding data piece is set in the output data register 101 1T before the timing 1. At the same timing, the requester 100 sets request information designating the crossbar output port OP0 in the requester register EVEN 103. At the timing 1, the request selection register 126 that corresponds to the requester 100 designates the EVEN side of the request register. Therefore, the information in the request register EVEN 103 is output from the requester 100 and then input via the request decoder 121 to the arbiter 122 as a request.

2. Output of the Preceding Data Piece from the Port

At the timing 1, the preceding data piece is input to the relay register 125 in the crossbar 140, and an arbitration result of the arbiter 122 is set in the selection register 123. At the timing 2, the selector 124 selects the data piece in the relay register 125 and sets the selected data piece in the crossbar output data register 150. Since a grant signal representing that output of the preceding data piece to the output port OP0 is permitted has been output to the requester 100 (output control circuit 102), the value retained by the request selection register 126 is changed to a value representing the ODD side at the timing 2. The preceding data piece set in the crossbar output data register 150 is output at the timing 3.

3. Output of a Following Data Piece from the Requester

A following data piece is set in the output data register 101 at the timing 1, which is the same timing as outputting the preceding data piece to the relay register 125. At the same timing, the requester 100 sets request information designating the crossbar output port. OP0 likewise the preceding data piece in the request register ODD 104. A selection signal for selecting the preceding data piece has been output from the crossbar 140 at the timing 1. Therefore, at the timing 2, the value retained by the request selection register 126 is changed to a value representing the ODD side, and the request information in the request register ODD 104 is output from the requester 100 and input via the request decoder 121 to the arbiter 122 as a request.

4. Output of the Following Data Piece from the Port

At the timing 2, the following data piece is input to the relay register 125 in the crossbar 140, and an arbitration result from the arbiter 122 is set in the selection register 123. At the timing 3, the selector 124 selects the data piece in the relay register 125 and outputs the data piece to the crossbar output data register 150. Since a grant signal representing that output of the following data piece to the output port OP0 is permitted has been output to the output control circuit 102, the value retained by the request selection register 126 is switched to a value representing the EVEN side at the timing 3. The following data piece set in the crossbar output data register 150 is output at the timing 4.

5. Improvement of the Crossbar Performance

Since data pieces can be successively output from the requester 100 to the crossbar output port OP0 in every 1T period by repeating the processes described in the above items 1 to 4, it is possible to improve the throughput. Further, since it is possible to output a request for the preceding data piece and the request for the following data piece from the requester 100 to the crossbar 140 at the same time even while the preceding data piece is retained in the relay register 125, latency between output of a request and reception of a grant signal can be shortened.

Note that while data output from the requester 100 is suspended due to an arbitration result of the arbiter 122 or 132, the value retained by the request selection register 126 is kept unchanged. That is, every time a selection signal representing that the data piece retained in the relay register 125 is to be output is output from the arbiter 122 or 132, the request input port to be selected by the selector 127 or 137 is switched between the EVEN side and the ODD side alternately.

Figure 5:
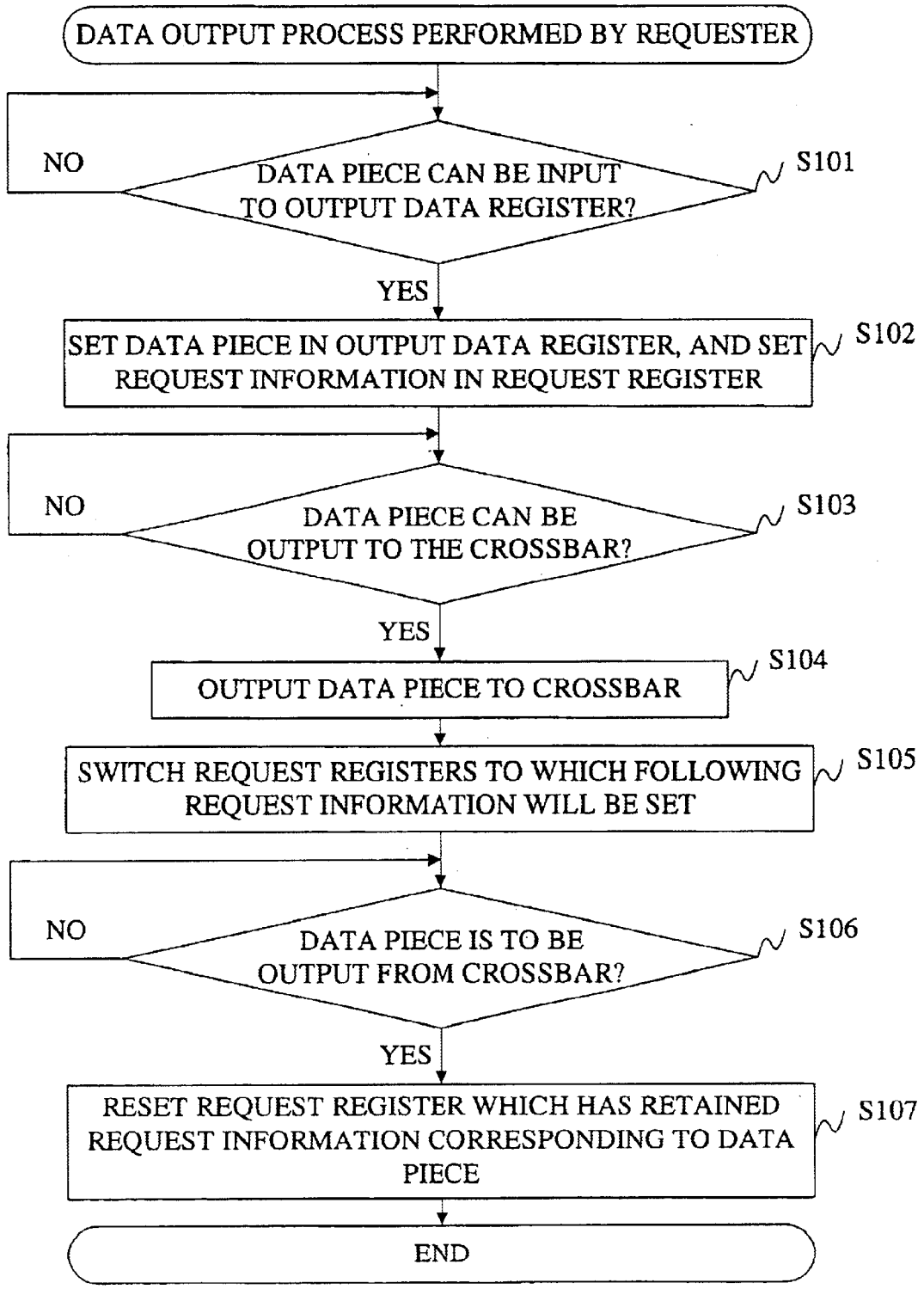
FIG. 5 is a flowchart showing a data output process performed by the requester of FIG. 3.

FIG. 5 shows a flowchart indicating a data output process performed by the requester 100.

In FIG. 5, the requester 100 first determines whether or not a data piece can be input to the output data register 101 (step S101). Specifically, the requester 100 determines whether or not a preceding data piece has been output from the output data register 101 to the crossbar 140.

In a case where the preceding data piece has not been output from the output data register 101 to the crossbar 140 (step S101: NO), the requester 100 waits until the preceding data piece is output to the crossbar 140. In a case where the preceding data piece has been output form the output data register 101 to the crossbar 140 (step S101: YES), the requester 100 sets the next data piece in the output data register 101, and sets request information corresponding to this data piece in the request register 103 or 104 (step S102).

Next, the requester 100 determines whether or not the data piece can be output to the crossbar 140 (step S103). Specifically, the requester 100 determines whether or not a grant signal representing that output of the preceding data piece to the crossbar output data register is permitted has been sent to the requester 100 from the crossbar 140. For example, if an arbitration result "0" has been sent from the selection register 123, the requester 100 determines that a grant signal has been sent to the requester 100.

In a case where the requester 100 has not received this grant signal (step S103: NO), the requester 100 waits until it receives the grant signal. In a case where the requester 100 has received the grant signal (step S103: YES), the requester 100 outputs the data piece to the crossbar 140 (i.e., the relay register 125) (step S104), and switches the request registers to which request information will be input (step S105).

Next, the requester 100 determines whether or not a grant signal representing that output of this data piece to the crossbar output data register is permitted has been sent to the requester 100 (step S106).

In a case where the requester 100 has not received this grant signal (step S106: NO), the requester 100 waits until it receives the grant signal. In a case where the requester 100 has received the grant signal (step S106: YES), the requester 100 resets the request register which has retained the request information corresponding to this data piece (step S107). Then, the requester 100 shifts to the data output process for the next data.

Figure 6:
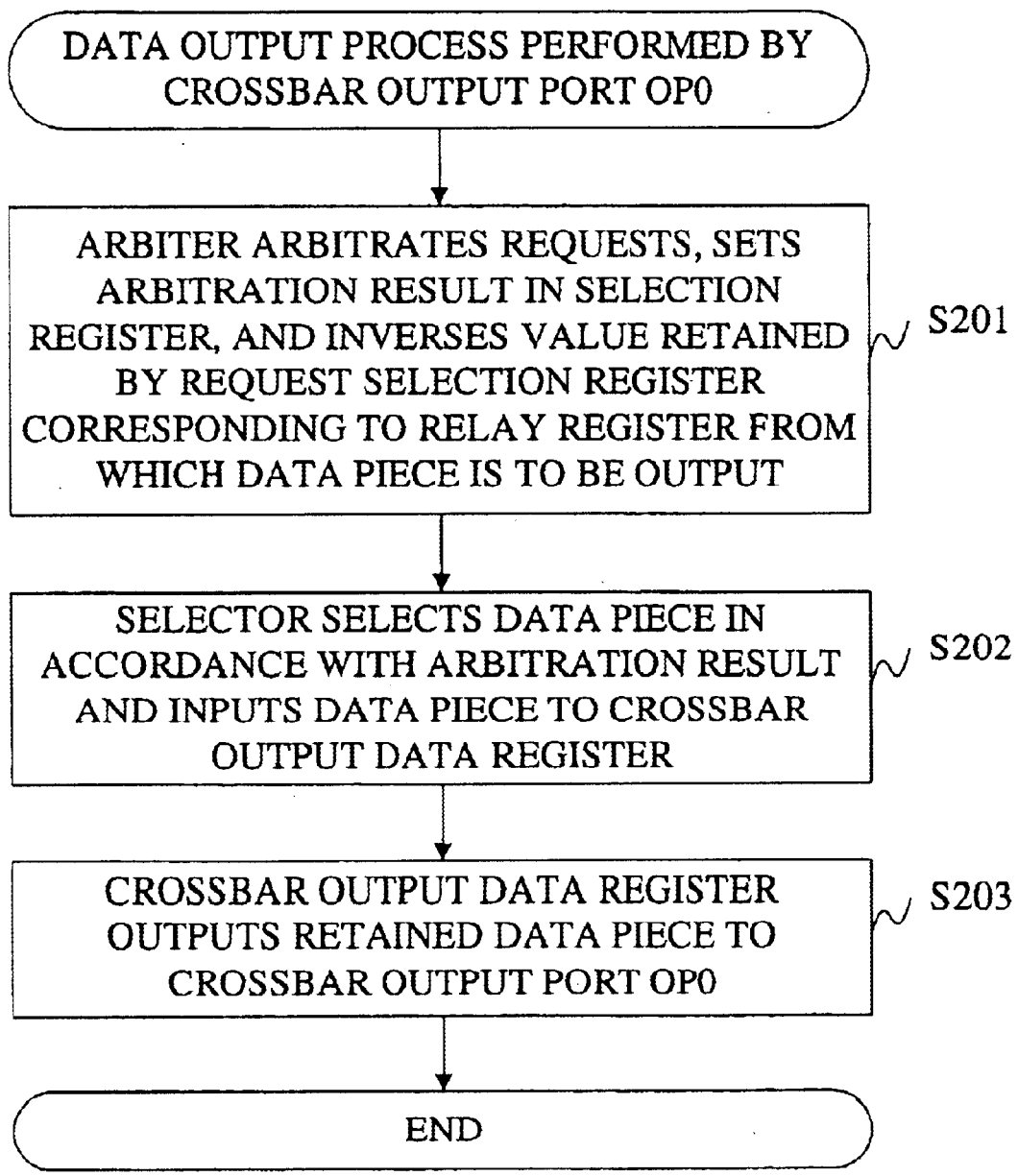
FIG. 6 is a flowchart showing a data output process performed by a crossbar output port OP0 of the crossbar of FIG. 2.

FIG. 6 shows a flowchart indicating a data output process performed by the crossbar output port OP0 of the crossbar 140.

First, the arbiter 122 which arbitrates data pieces to be output from the crossbar output port OP0, determines the priority of request signals sent from the request decoders 121 and 131 in accordance with a predetermined method, in order to determine the data piece (arbitration result) to be output to the crossbar output data register 150. Then, the arbiter 122 sets the arbitration result in the selection register, and inverts the value retained by the request selection register which is at the side of the relay register from which data piece is to be output (step S201).

For example, in a case where it is determined that the data piece sent from the requester 100 should be output to the crossbar output data register 150, the arbiter 122 sets the arbitration result as "0" in the selection register 123. In a case where it is determined that the data piece sent from the requester 110 should be output to the crossbar output data register 150, the arbiter 122 sets the arbitration result as "1" in the selection register 128. Further, the arbitration result is sent to the request selection registers 126 and 136. When the arbitration result "0" is sent, the request selection register 126 inverses a bit value representing which of the request input ports 120A and 120B should be selected. (That is, if a value "0" which is retained by the request selection register 126 represents information that the request input port 120A is to be selected by the selector 127, this value "0" is inverted to "1" due to the arbitration result "0".) Likewise, in a case where the request selection register 136 receives an arbitration result "1", the request selection register 136 inverses a bit value representing which of the request input ports 130A and 130B should be selected.

Next, the selector 124 selects the data piece in either one of the relay registers 125 and 135 in accordance with the arbitration result retained in the selection register 123, and inputs the selected data piece into the crossbar output data register 150 (step S202). For example, if the arbitration result is "0", the selector 124 selects the data piece in the relay register 125, and inputs this data piece to the crossbar output data register 150.

Next, the data piece set in the crossbar output data register 150 is output to the crossbar output port OP0 (step S203). Then, the flow goes to the data output process for the next data.

Figure 7:
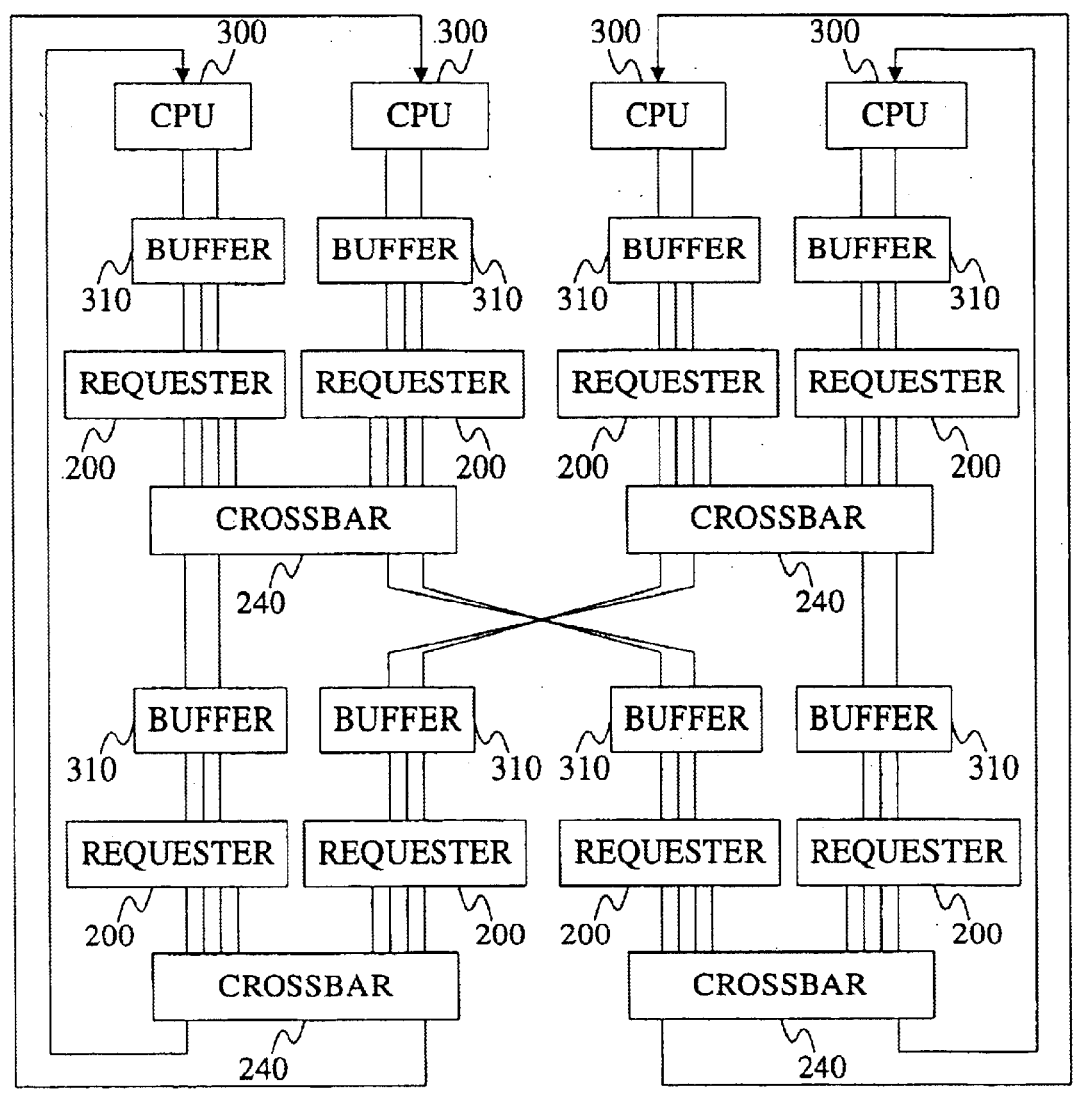
FIG. 7 is a block diagram showing a structure of a crossbar switch employing a crossbar according to a second embodiment of the present invention.

Further, multistage interconnection of the crossbar circuit of the present invention is available. FIG. 7 shows an embodiment where crossbars of the present invention each having two inputs and two outputs are interconnected over two stages.

The crossbar circuit shown in FIG. 7 includes four crossbars 240. Each crossbar 240 is the same as the crossbar 140 except that the crossbar 240 has request output ports for transferring the request information to the next stage. Note that since the request information output from the crossbar 240 at the second stage (the last stage) is not used, the request output ports of the crossbars 240 at the second stage are not illustrated in FIG. 7. (The crossbars 240 arranged at the last stage need not to have a function for outputting the request information.)

The requester 200 has the same function as that of the requester 100, and is connected to the crossbar 240.

Figure 8:
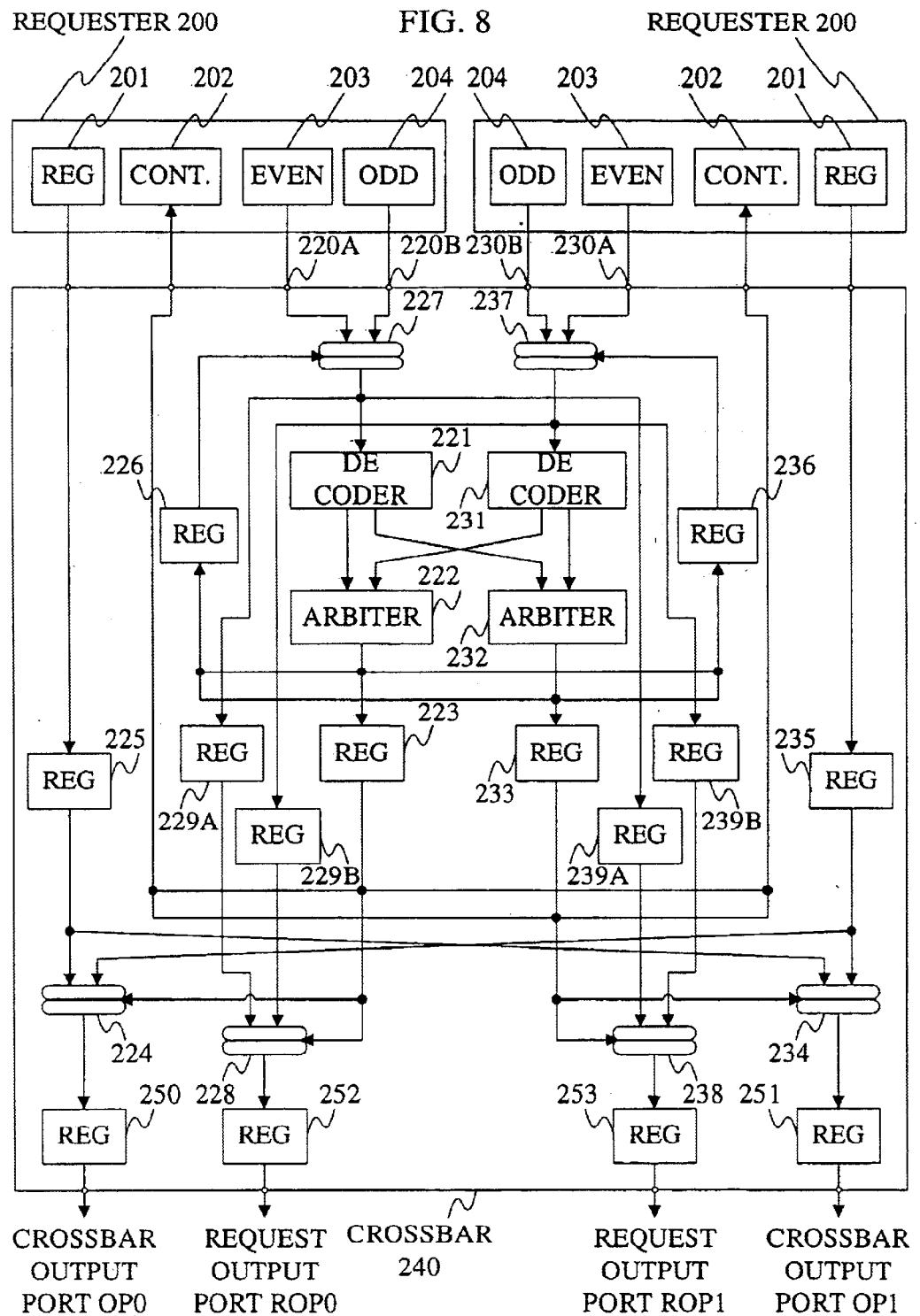
FIG. 8 is a block diagram showing a structure of the crossbar as the second embodiment of the present invention.
Figure 9:
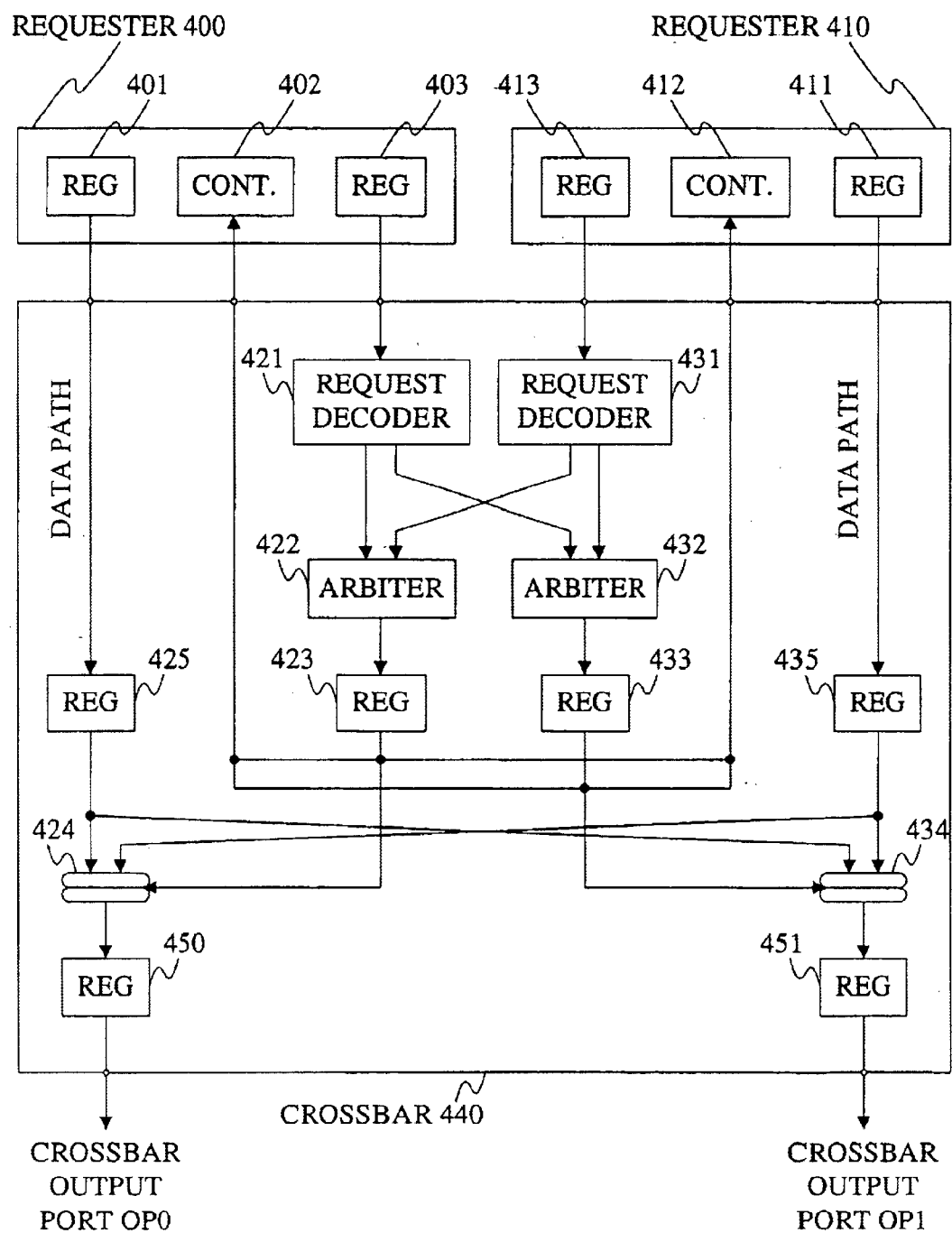
FIG. 9 is a block diagram showing a data exchange system according to a conventional control method.

FIG. 8 is a block diagram showing the crossbar 240. It is known from FIG. 8 that the crossbar 240 has the functions of the crossbar 140 shown in FIG. 2. Further, the crossbar 240 has selectors 228 and 238 for outputting the request information to the next stage, for the respective output ports. Furthermore, the crossbar 240 has request relay registers 229A, 229B, 239A and 239B for retaining and outputting request information selected by the selectors 227 and 237. The request information to be selected by the selector 228 or 238 is selected in accordance with a selection signal from the selection register 223 or 233. The selected request information is set in the request output register 252 or 253, such that the data piece set in the output data register 250 or 251 corresponds to the selected request information. Then, at the same timing as the timing at which the data piece is output to the crossbar output port OP0, the request information corresponding to this data piece is output from the request output port OP0. As a result, the data piece can be properly output to the designated port in the crossbar 240 at the next stage.

According to the present invention, the crossbar having two inputs and two outputs has been explained so far. However, needless to say, the present invention can be applied to a crossbar having more inputs and outputs. Further, according to the present invention, the number of request input ports of the crossbar is two for each requester. However, by preparing more request input ports for each requester, it is possible to increase the number of relay registers on the data paths. In this case, the increased number of request input ports would be selected by the selectors 127 and 137 cyclically. Likewise, in the requesters 100 and 110, the request registers will be selected cyclically, and request information will be set in the selected request register. As a result, since the arbitration process by the crossbar can be realized in accordance with a plurality of clocks, the present invention provides a more effective method for LSI designing in which conditions for wiring delay and logical delay are strict. It should be noted that the number of relay registers must be smaller than the number of request input ports, in order to prevent the request information of the data piece from disappearing. Further, for the same reason, the number of request input ports needs to be larger than the number of clocks required in the arbitration process.

Furthermore, according to the present invention, a crossbar switch to which processors are connected has been explained. However, it is also possible to connect processors, memories, I/O units, etc. with one another.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-146712 filed on May 21, 2002 and including specification, claims, drawings and summary. The disclosure of the above Japanese Patent Application is incorporated herein by reference in its entirety.

What is claimed is:

1. A crossbar system comprising: i (i being a natural number equal to or greater than 2) number of requesters; and a crossbar which receives from said i number of requesters, an output data piece and request information including information representing that the output data piece is requested to be output from a desired output port among k (k being a natural number) number of output ports included in said crossbar, and which outputs the received output data piece to the desired output port, wherein:

each of said requesters includes an output data register from which the output data piece is output, j (j being a natural number equal to or greater than 2) number of request information registers from which the request information is output, and an output control circuit;

said crossbar includes i number of first selection circuits which are arranged in one to one correspondence to said i number of requesters, and which select any of j number of request information supplied from a corresponding one of said requesters in accordance with a selection control signal retained by themselves, k number of arbiters which are arranged in one to one correspondence to said k number of output ports, arbitrates each request represented by the j number of request information output from said i number of first selection circuits, and outputs an arbitration result signal, and i number of request selection control circuits which are arranged in one to one correspondence to said i number of requesters, and which receive the arbitration result signals output from said k number of arbiters, updates the selection control signal based on the arbitration result signals, and supplies the selection control signal to said first selection circuits.

2. The crossbar system according to claim 1, wherein:

said crossbar further includes i number of decoding circuits which are arranged in one to one correspondence to said i number of first selection circuits, and which convert the request information to the request and send the request to the desired output port which is designated by the request information; and each of said arbiters arbitrates requests output from said i number of decoding circuits, and outputs the arbitration result signal.

3. The crossbar system according to claim 2, wherein:

said first selection circuits select said request information input ports cyclically in accordance with the selection control signal retained by themselves to select the j number of request information; and said output control circuit cyclically selects said request information registers in which request information corresponding to an output data piece to be output next is set.

4. The crossbar system according to claim 3, wherein said crossbar further includes:

k number of request output ports; and k number of third selection circuits which are arranged in one to one correspondence to said k number of selection registers, and which each receive the arbitration result signal from a corresponding one of said selection registers, select any of request information selected by said i number of first selection circuits, and output the selected request information to said request output ports associated with themselves in one to one correspondence.

5. The crossbar system according to claim 4, wherein in said crossbar, each of said i number of relay circuits is a circuit which is constituted by m (m being a natural number) number of registers.

6. The crossbar system according to claim 5, wherein said crossbar circuit operates synchronously with a clock signal which is generated periodically.

7. A crossbar system comprising: i (i being a natural number equal to or greater than 2) number of requesters; and a crossbar which receives from said i number of requesters, an output data piece and request information including information representing that the output data piece is requested to be output from a desired output port among k (k being a natural number) number of output ports included in said crossbar, and which outputs the received output data piece to the desired output port, wherein:

each of said requesters includes an output data register from which the output data piece is output, j (j being a natural number equal to or greater than 2) number of request information registers from which the request information is output, and an output control circuit; and said crossbar includes i number of first selection circuits which are arranged in one to one correspondence to said i number of requesters, and which select any of j number of request information supplied from a corresponding one of said requesters in accordance with a selection control signal retained by themselves, k number of arbiters which are arranged in one to one correspondence to said k number of output ports, arbitrates each request represented by the j number of request information output from said i number of first selection circuits, and outputs an arbitration result signal, and i number of request selection control circuits which are arranged in one to one correspondence to said i number of requesters, and which receive the arbitration result signals output from said k number of arbiters, updates the selection control signal based on the arbitration result signals, and supplies the selection control signal to said first selection circuits.

8. The crossbar system according to claim 7, wherein:

said crossbar further includes i number of decoding circuits which are arranged in one to one correspondence to said i number of first selection circuits, and which convert the request information to the request and send the request to the desired output port which is designated by the request information; and each of said arbiters arbitrates requests output from said i number of decoding circuits, and outputs the arbitration result signal.

9. The crossbar system according to claim 8, wherein:

said crossbar further includes k number of output data registers which are arranged in one to one correspondence to said k number of second selection circuits, and which retain an output data piece output from a corresponding one of said second selection circuit, and output the retained output data piece to said output port associated with themselves in one to one correspondence; and said k number of second selection circuits are circuits which are arranged in one to one correspondence to said k number of selection registers, and which receive the arbitration result signal from a corresponding one of said selection registers, receive output data pieces from said i number of relay circuits, select any one of the received output data pieces in accordance with the received arbitration result signal, and output the selected output data piece to said output data registers.

10. The crossbar system according to claim 9, wherein:

said first selection circuits select said request information input ports cyclically in accordance with the selection control signal retained by themselves to select the j number of request information; and said output control circuit cyclically selects said request information registers in which request information corresponding to an output data piece to be output next is set.

11. The crossbar system according to claim 10, wherein said crossbar further includes:

k number of request output ports; and k number of third selection circuits which are arranged in one to one correspondence to said k number of selection registers, and which each receive the arbitration result signal from a corresponding one of said selection registers, select any of request information selected by said i number of first selection circuits, and output the selected request information to said request output ports associated with themselves in one to one correspondence.

12. The crossbar system according to claim 11, wherein said crossbar further includes request relay registers which are arranged between said first selection circuits and said third selection circuits, and which retain and output request information selected by said first selection circuits.

13. (currently amended) The crossbar system according to claim 12, wherein:

said crossbar further includes k number of request output registers which are arranged in one to one correspondence to said k number of third selection circuits, and which retain request information output from a corresponding one of said third selection circuits and output the request information to said request output ports associated with themselves in one to one correspondence; and said k number of third selection circuits are circuits which are arranged in one to one correspondence to said k number of selection registers, and which receive the arbitration result signal from a corresponding one of said selection registers, receive output data pieces from said i number of relay registers, select any of the received output data pieces in accordance with the received arbitration result signal, and output the selected output data piece to said request output registers.

14. The crossbar system according to claim 13, wherein in said crossbar, each of said i number of relay circuits is a circuit which is constituted by m (m being a natural number) number of registers.

15. The crossbar system according to claim 14, wherein in said crossbar, there is a relationship m<k, between the value m and the value k.

16. The crossbar system according to claim 10, wherein said crossbar circuit operates synchronously with a clock signal which is generated periodically.

17. The crossbar system according to claim 16, wherein in said crossbar circuit, there is a relationship k>n, between the value k and a value n which represents a number of clock cycles needed from a timing at which request information is selected by said i number of first selection circuits to a timing at which the arbitration result signal is set in said k number of selection registers.

18. The crossbar system according to claim 1, wherein said crossbar further includes k number of selection registers which are arranged in one to one correspondence to said k number of arbiters, and which retain the arbitration result signal output from a corresponding one of said arbiters; and wherein said output control circuit receives the arbitration result signal from said k number of selection register.

19. The crossbar system according to claim 18, wherein said crossbar further includes:

i number of relay circuits which are connected to said i number of data input ports respectively, and which retain a data piece input thereto, and k number of second selection circuits which are arranged in one to one correspondence to said k number of selection registers, and which receive the arbitration result signal from a corresponding one of said selection registers, receive output data pieces from said i number of relay circuits, select any one of the received output data pieces in accordance with the received arbitration result signal, and output the selected output data piece to said output port associated with themselves in one to one correspondence.

20. The crossbar system according to claim 7, wherein said crossbar further includes k number of selection registers which are arranged in one to one correspondence to said k number of arbiters, and which retain the arbitration result signal output from a corresponding one of said arbiters; and wherein said output control circuit receives the arbitration result signal from said k number of selection register.

21. The crossbar system according to claim 20, wherein said crossbar further includes:

i number of relay circuits which are connected to said i number of data input ports respectively, and which retain a data piece input thereto, and k number of second selection circuits which are arranged in one to one correspondence to said k number of selection registers, and which receive the arbitration result signal from a corresponding one of said selection registers, receive output data pieces from said i number of relay circuits, select any one of the received output data pieces in accordance with the received arbitration result signal, and output the selected output data piece to said output port associated with themselves in one to one correspondence.

22. A control method for a crossbar system which comprises a crossbar for receiving a data piece and request information representing a desired output port of the data piece from a plurality of requesters for outputting each received data piece to the desired output port, said method comprising:

an output preparation step of setting by each of said plurality of requesters, a data piece in a predetermined register, and also setting the request information for the data piece in a predetermined register group;

an output step of outputting by each of said plurality of requesters, the data piece and the request information set in said output preparation step to said crossbar;

a reception step of receiving by said crossbar, the request information from each said plurality of requesters via two or more request signal input ports which are prepared for each requester;

a selection step of selecting the request information received in said reception step requester by requester, so that said crossbar can arbitrate only such request information as corresponding to a data piece which can immediately be output from said crossbar after arbitration; and an arbitration step of arbitrating by said crossbar, the request information selected in said selection step, and outputting an arbitration result to each of said plurality of requesters as an arbitration result signal, wherein:

said selection step receives the arbitration result signal output in said arbitration step, and in a case where the arbitration result signal is a signal instructing that the data piece output by a corresponding requester in said output step is to be output from the desired output port, switching input ports to be selected such that request information corresponding to a next data piece following the data piece will be arbitrated in said arbitration step; and said output preparation step receives the arbitration result signal output in said arbitration step, and in a case where the received arbitration result signal is a signal representing that the data piece output in said output preparation step is selected to be output from the desired output port, setting a next data piece in the predetermined register, and setting request information corresponding to a data piece next to the next data piece in the predetermined register group so as not to write this request information upon request information corresponding to the next data piece.

* * * * *